US012647880B2

(12) United States Patent
Solanki et al.

(10) Patent No.: US 12,647,880 B2
(45) Date of Patent: Jun. 2, 2026

(54) BASE STATION SELECTION SYSTEM AND METHOD

(71) Applicant: RAKUTEN SYMPHONY, INC., Tokyo (JP)

(72) Inventors: Kuldeep Solanki, Madhya Pradesh (IN); Pankaj Mukati, Madhya Pradesh (IN); Rachit Sethi, Madhya Pradesh (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 380 days.

(21) Appl. No.: 17/905,764

(22) PCT Filed: Jul. 1, 2022

(86) PCT No.: PCT/US2022/035893
§ 371 (c)(1),
(2) Date: Sep. 7, 2022

(87) PCT Pub. No.: WO2024/005836
PCT Pub. Date: Jan. 4, 2024

(65) Prior Publication Data
US 2024/0214919 A1     Jun. 27, 2024

(51) Int. Cl.
*H04W 48/18*          (2009.01)
*H04L 41/122*         (2022.01)
(Continued)

(52) U.S. Cl.
CPC ........... *H04W 48/20* (2013.01); *H04L 41/122* (2022.05); *H04L 41/22* (2013.01); *H04W 48/16* (2013.01)

(58) Field of Classification Search
CPC . H04W 24/08; H04W 24/10; H04W 36/0058; H04W 36/18; H04W 52/04; H04W 52/08; H04W 52/24; H04W 52/36; H04W 52/362; H04W 52/367; H04W 52/38; H04W 52/40; H04W 56/00; H04W 72/044; H04W 72/0446; H04W 74/06; H04W 76/10; H04W 76/12; H04W 92/12;
(Continued)

(56) References Cited

U.S. PATENT DOCUMENTS

| 2003/0083073 A1* | 5/2003 | Cossins ................... | H04L 67/75 |
| | | | 455/446 |
| 2011/0244892 A1* | 10/2011 | MacManus ............. | H04W 4/02 |
| | | | 455/457 |

(Continued)

FOREIGN PATENT DOCUMENTS

| CN | 102638833 A | * | 8/2012 | |
| WO | WO-2019120546 A1 | * | 6/2019 | ........... H04L 41/122 |

*Primary Examiner* — Quan M Hua
(74) *Attorney, Agent, or Firm* — HAUPTMAN HAM, LLP

(57) ABSTRACT

A computer-implemented method includes receiving, from a user interface, base station configuration criteria including a nominal location, a coverage area, and a search area, uploading base station configuration parameters, identifying, based on the base station configuration criteria and parameters, a set of base station candidates included in the search area, ranking the set of base station candidates, outputting the ranked set of base station candidates to the user interface, and receiving a base station selection from the user interface.

20 Claims, 8 Drawing Sheets

(51) Int. Cl.
 H04L 41/22 (2022.01)
 H04W 48/16 (2009.01)
 H04W 48/20 (2009.01)

(58) Field of Classification Search
 CPC . H04W 12/06; H04W 28/02; H04W 28/0289;
   H04W 36/1443; H04W 76/50; H04W
  8/04; H04W 48/02; H04W 72/20; H04L
                  1/20
 See application file for complete search history.

(56) References Cited

U.S. PATENT DOCUMENTS

| | | | |
|---|---|---|---|
| 2012/0113971 A1* | 5/2012 | Giaretta | H04W 48/20 |
| | | | 370/338 |
| 2013/0130694 A1* | 5/2013 | Kherani | H04W 52/0216 |
| | | | 455/437 |
| 2014/0137161 A1 | 5/2014 | Park | |
| 2019/0104026 A1* | 4/2019 | Zhang | H04L 41/122 |
| 2019/0281624 A1 | 9/2019 | Kim et al. | |

\* cited by examiner

300

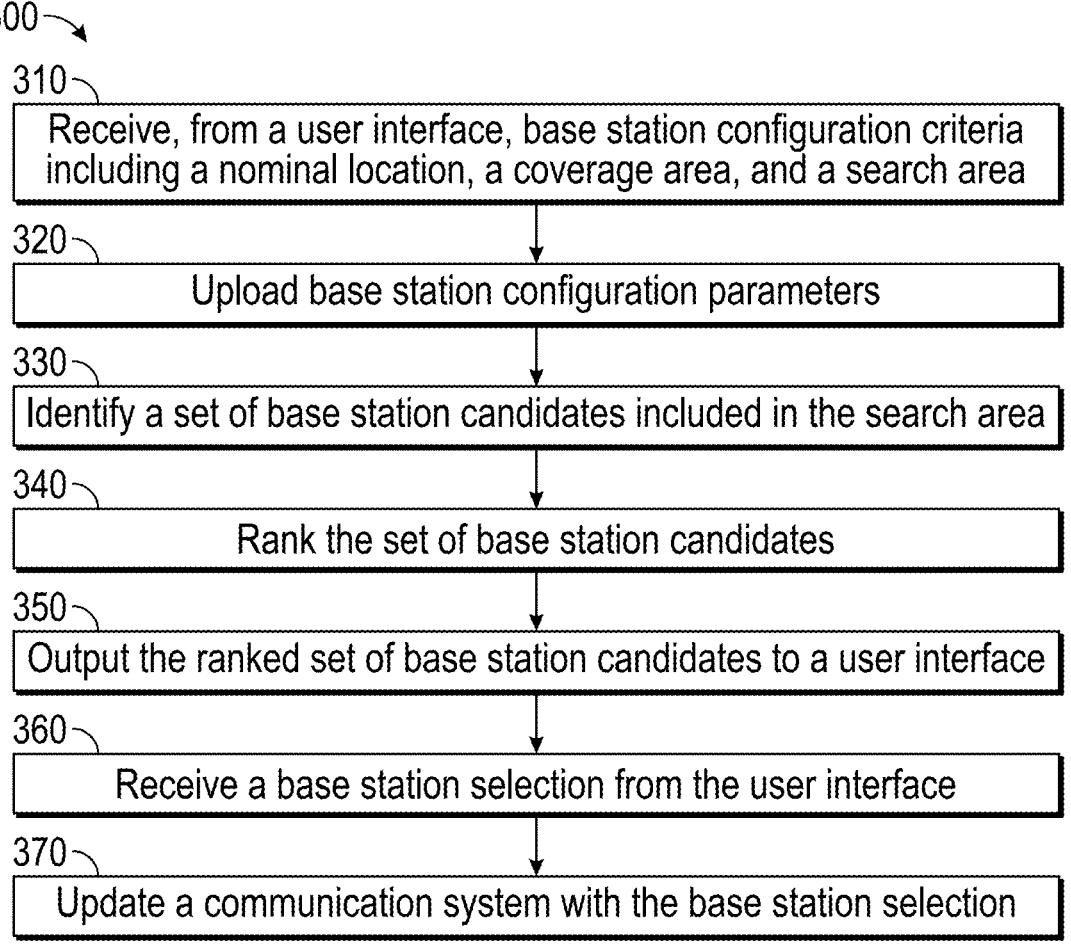

310
Receive, from a user interface, base station configuration criteria including a nominal location, a coverage area, and a search area 320
Upload base station configuration parameters 330
Identify a set of base station candidates included in the search area 340
Rank the set of base station candidates 350
Output the ranked set of base station candidates to a user interface 360
Receive a base station selection from the user interface 370
Update a communication system with the base station selection

FIG. 3

Candidate Site Planning

UPLOAD XLSX    TP CANDIDATE    ∨ SUBMIT TASK

| Nominal Site | Nominal Lat/Lng | Mapped TP Ca... | Actual Search Ring... | Planned Search Ri... | Planned RF Height(... | TP Availability | Actions |
|---|---|---|---|---|---|---|---|
| | | | | | | | |

Page: 1    Rows per page: 25    1-2 of 2

FIG. 4

Figure 5:
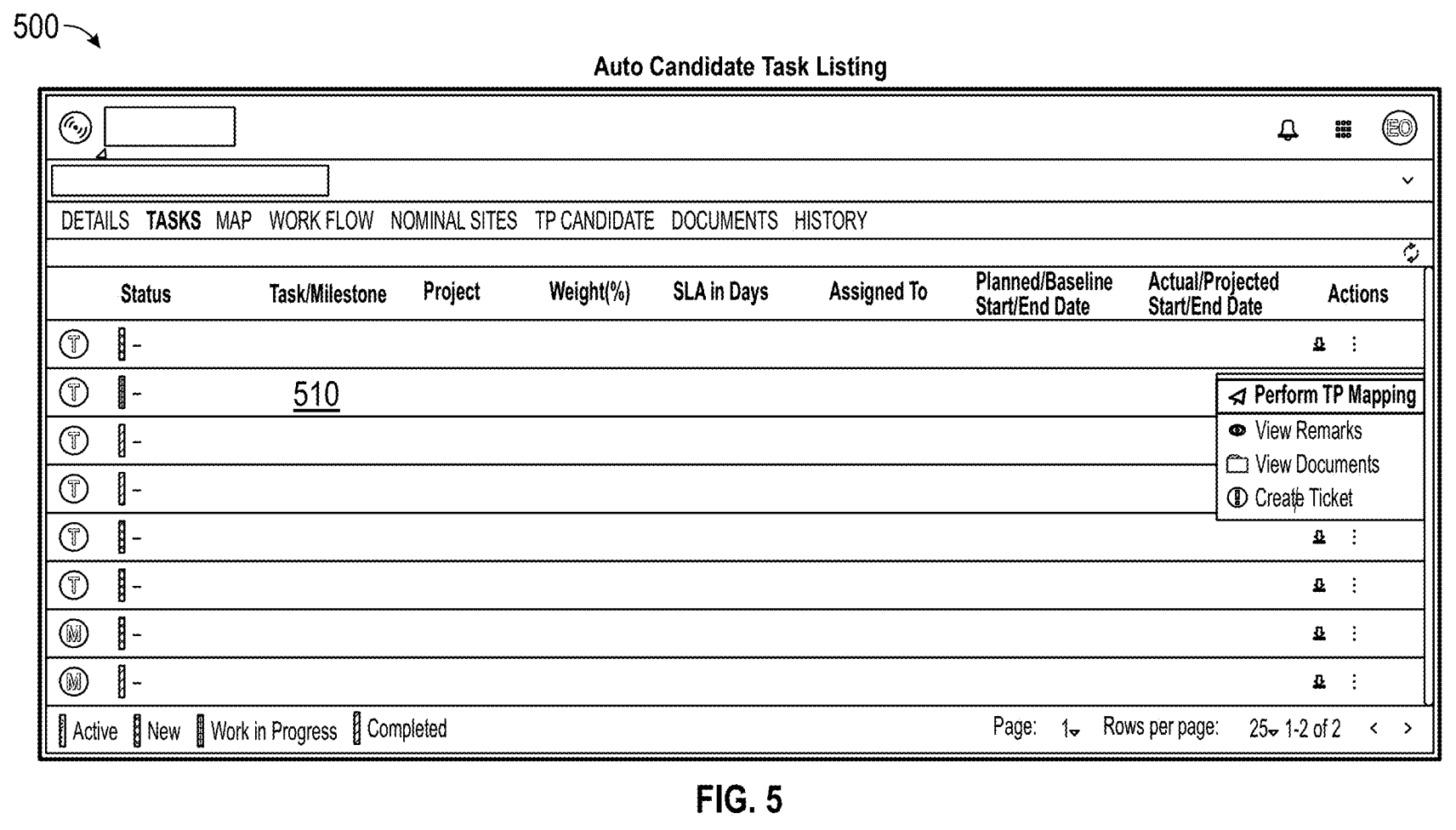

Auto Candidate Task Listing

DETAILS  TASKS  MAP  WORK FLOW  NOMINAL SITES  TP CANDIDATE  DOCUMENTS  HISTORY

| Status | Task/Milestone | Project | Weight(%) | SLA in Days | Assigned To | Planned/Baseline Start/End Date | Actual/Projected Start/End Date | Actions |
|--------|----------------|---------|-----------|-------------|-------------|--------------------------------|--------------------------------|---------|
| | | | | | | | | ... |
| | 510 | | | | | | | |
| | | | | | | | | ✓ Perform TP Mapping |
| | | | | | | | | ◉ View Remarks |
| | | | | | | | | ▭ View Documents |
| | | | | | | | | ⊕ Create Ticket |
| | | | | | | | | ... |
| | | | | | | | | ... |
| | | | | | | | | ... |
| | | | | | | | | ... |

Page:  1    Rows per page:  25    1-2 of 2

Active  New  Work in Progress  Completed

BASE STATION SELECTION SYSTEM AND METHOD

RELATED APPLICATIONS

The present application is a National Phase of International Application No. PCT/US2022/035893, filed Jul. 1, 2022.

TECHNICAL FIELD

This description relates to a base station candidate selection system and a method of using the same.

BACKGROUND

Network functions virtualization (NFV) is a network architecture concept that leverages virtualization technologies to virtualize entire classes of network node functions into building blocks that connect, or chain together, to create and deliver communication services. NFV is based upon traditional server-virtualization techniques such as those used in enterprise information technology (IT). A virtualized network function (VNF) is typically implemented within one or more virtual machines (VMs) or containers running different software and processes, on top of commercial off the shelf (COTS) high-volume servers, switches, and storage devices, or even cloud computing infrastructure, instead of having custom hardware appliances for each network function. The decoupling of the network function software from the customized hardware platform realizes a flexible network architecture that enables agile network management. A cloud-native network function (CNF) is a software-implementation of a network function, which typically runs inside a Linux container that is traditionally performed by a physical device. A radio-access network (RAN) or virtual RAN (vRAN) is a mobile telecommunication system that implements a radio access technology in which base stations reside between such networks and devices such as mobile phones.

SUMMARY

In some embodiments, a method executed by a processor includes receiving, from a user interface, base station configuration criteria including a nominal location, a coverage area, and a search area, uploading base station configuration parameters, identifying, based on the base station configuration criteria and the base station configuration parameters, a set of base station candidates included in the search area, ranking the set of base station candidates, outputting the ranked set of base station candidates to the user interface, and receiving a base station selection from the user interface.

In some embodiments, a system includes a user interface, a memory having non-transitory instructions stored therein, and a processor coupled to the memory. The processor is configured to execute the instructions, thereby causing the system to receive, from the user interface, base station configuration criteria including a nominal location, a coverage area, and a search area, upload base station configuration parameters, identify, based on the base station configuration criteria and the base station configuration parameters, a set of base station candidates included in the search area, rank the set of base station candidates, display the ranked set of base station candidates on the user interface, and receive a base station selection from the user interface.

In some embodiments, a computer-readable medium includes instructions executable by processing circuitry of a system to cause the system to perform operations including receiving, from a user interface, base station configuration criteria including a nominal location, a coverage area, and a search area, uploading base station configuration parameters, identifying, based on the base station configuration criteria and the base station configuration parameters, a set of base station candidates included in the search area, ranking the set of base station candidates, outputting the ranked set of base station candidates to the user interface, and receiving a base station selection from the user interface.

BRIEF DESCRIPTION OF DRAWINGS

Aspects of the present disclosure are best understood from the following detailed description when read with the accompanying figures. In accordance with the standard practice in the industry, various features are not drawn to scale. In fact, the dimensions of the various features are arbitrarily increased or reduced for clarity of discussion.

FIG. 3 is a flowchart of a candidate selection method, in accordance with some embodiments.

FIG. 4 depicts a non-limiting example of a graphical user interface (GUI), in accordance with some embodiments.

FIG. 5 depicts a non-limiting example of a GUI, in accordance with some embodiments.

DETAILED DESCRIPTION

Figure 1:
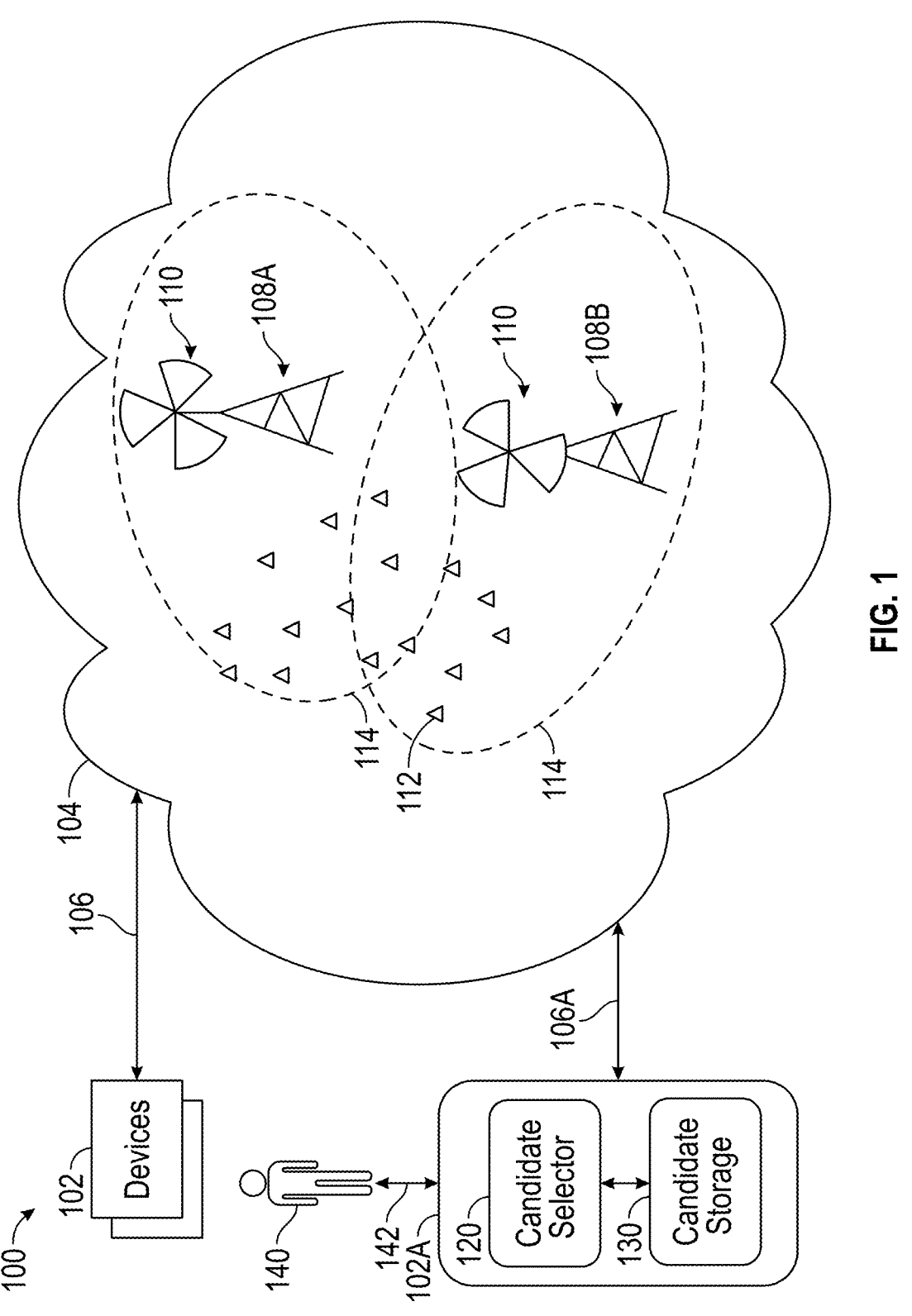
FIG. 1 is block diagram of a communication system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation or position of a first feature over or on a second feature in the description that follows include embodiments in which the first and second features are formed or positioned in direct contact and include embodiments in which additional features are formed or positioned between the first and second features, such that the first and second features are in indirect contact. In addition, the present disclosure repeats reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, are used herein for ease of description to describe one element or feature's relationship to another element(s) or feature(s) as illustrated in the figures. The spatially relative terms are intended to encompass different orientations of a system or object in use or operation in addition to the orientation depicted in the figures. The system is otherwise oriented (rotated 90 degrees or at other orientations) and the spatially relative descriptors used herein likewise are interpreted accordingly.

In various embodiments, a method, apparatus, and computer readable medium are directed to automatically receiving, from a user interface, base station configuration criteria including a nominal location, a coverage area, and a search area, uploading base station configuration parameters, identifying a set of base station candidates included in the search area, ranking the candidates, outputting the ranked candidates to the user interface, and receiving a base station selection from the user interface. In some embodiments, the base station selection is used to update a communication system.

FIG. 1 is a block diagram of a communication system 100 (hereinafter referred to as "system 100"), in accordance with some embodiments.

System 100 includes a plurality of devices 102 coupled to a network 104 by a plurality of links 106. Network 104 is coupled to a device 102A of plurality of devices 102 by a link 106A of plurality of links 106. Plurality of devices 102 including device 102A are coupled to each other through network 104 and plurality of links 106 including link 106A.

Figure 8:
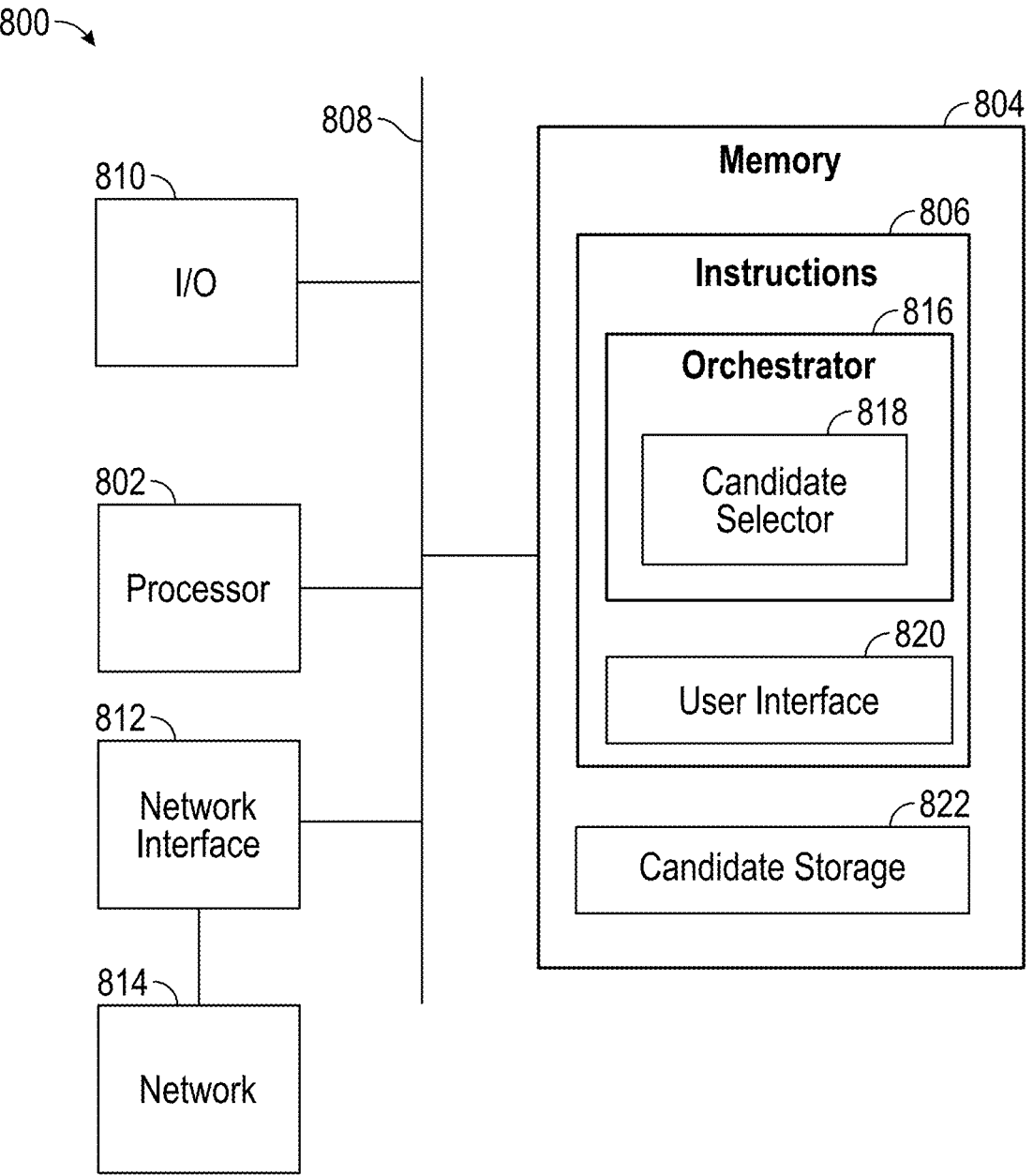
FIG. 8 is a diagram of a candidate selection system, in accordance with some embodiments.

In various embodiments, the devices of plurality of devices 102 correspond to combinations of computing devices, computing systems, servers, server clusters, and/or pluralities of server clusters also referred to as server farms or data centers in some embodiments. In some embodiments, a system 800 discussed below with respect to FIG. 8 is an embodiment of one or more of plurality of devices 102.

In some embodiments, one or more of plurality of devices 102 is a type of mobile terminal, fixed terminal, or portable terminal including a desktop computer, laptop computer, notebook computer, netbook computer, tablet computer, wearable circuitry, mobile handset, server, gaming console, or combination thereof. In some embodiments, one or more of plurality of devices 102 includes a display by which a user interface is displayed. Other configurations and/or types of devices in plurality of devices 102 are within the scope of the present disclosure.

In the embodiment depicted in FIG. 1, device 102A, including a candidate selector 120 and a candidate storage 130, is configured to interface with a user 140 through a user interface 142 as discussed below.

Network 104 is one or more interconnected devices configured to provide electronic communications between and among the interconnected devices and plurality of devices 102, in some cases through plurality of links 106. In some embodiments, network 104 corresponds to the internet.

In some embodiments, network 104 includes or represents a radio-access network (RAN) or virtual RAN (vRAN), a mobile telecommunication system that implements a radio access technology and provides connection with plurality of devices 102.

In some embodiments, one or more of the interconnected devices of network 104 and/or plurality of devices 102 are configured as one or more of a local area network (LAN), a wide area network (WAN), a metropolitan area network (MAN), an internet area network (IAN), a campus area network (CAN), or a virtual private network (VPN). In some embodiments, one or more of the interconnected devices of network 104 and/or plurality of devices 102 are configured as a backbone or core network (CN), a part of a computer network which interconnects networks, providing a path for the exchange of information between different LANs, WANs, etc.

In some embodiments, some of the interconnected devices of network 104 and/or plurality of devices 102 are configured as server clusters, e.g., included in a data center. In some embodiments, the server clusters are part of a cloud computing environment.

In the embodiment depicted in FIG. 1, network 104 includes base stations 108A and 108B (hereinafter base station 108), each including an antenna 110 wirelessly connected to one or more instances of user equipment (UE) 112 located in a geographic coverage area 114.

In some embodiments, network 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (O-RAN), or cloud-RAN (C-RAN). In some embodiments, network 104 resides between UE 112 (e.g., mobile phone, a computer, or any remotely controlled machine) and one or more core networks.

In some embodiments, network 104 is a hierarchical telecommunications network including one or more intermediate link(s), also referred to as backhaul portions in some embodiments, between a RAN and one or more core networks. Two non-limiting examples of mobile backhaul implementations are fiber-based backhaul and wireless point-to-point backhaul. Other methods, such as copper-based wireline, satellite communications and point-to-multipoint wireless technologies are less common out as capacity and latency requirements become higher in 4G and 5G networks. Backhaul generally refers to the side of the network that communicates with the global internet. UE 112 communicating with a base station 108 constitute a local subnetwork. In some embodiments, a backhaul includes wired, fiber optic, and/or wireless components including microwave bands and mesh and edge network topologies that use a high-capacity wireless channel to get packets to the microwave or fiber links.

In some embodiments, base stations 108 are lattice or self-supported towers, guyed towers, monopole towers, and/or concealed towers (e.g., towers designed to resemble trees, cacti, water towers, signs, light standards, and other types of structures). In some embodiments, a base station 108 is a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers, transceivers, digital signal processors, control electronics, a remote radio head (RRH), primary and backup electrical power sources, and sheltering. Base stations are known by other names such as base transceiver station, mobile phone mast, or cell tower. In some embodiments, base stations are edge devices configured to wirelessly communicate with UEs. The edge device provides an entry point into service provider core networks. Examples include routers, routing switches, integrated access devices (IADs), multiplexers, and a variety of metropolitan area network (MAN) and wide area network (WAN) access devices.

In at least one embodiment, an instance of antenna 110 is a sector antenna. In some embodiments, an instance of antenna 110 is a type of directional microwave antenna with a sector-shaped radiation pattern. In some embodiments, the sector degrees of arc are 60°, 90° or 120° designs with a few degrees extra to ensure overlap. Further, sector antennas are mounted in multiples when wider coverage or a full-circle coverage is desired. In some embodiments, an instance of antenna 110 is a rectangular antenna, sometimes called a panel antenna or radio antenna, used to transmit and receive waves or data between mobile devices or other devices and a base station. In some embodiments, an instance of antenna 110 is a circular antenna. In some embodiments, an instance of antenna 110 operates at microwave or ultra-high frequency (UHF) frequencies (300 MHz to 3 GHZ). In some embodiments, instances of antenna 110 are chosen for their size and directional properties.

In various embodiments, a given base station 108 and corresponding instance(s) of antenna 110 are provided by a vendor, also referred to as a tower provider in some embodiments. The vendor owns the tower and leases the corresponding equipment to one or more global communication system providers, e.g., a RAN provider.

In some embodiments, an instance of UE 112 is a computer or computing system. In some embodiments, an instance of UE 112 has a liquid crystal display (LCD), light-emitting diode (LED) or organic light-emitting diode (OLED) screen interface, such as a graphical user interface providing a touchscreen interface with digital buttons and keyboard or physical buttons along with a physical keyboard. In some embodiments, an instance of UE 112 connects to the internet and interconnects with other devices. In some embodiments, an instance of UE 112 incorporates integrated cameras, the ability to place and receive voice and video telephone calls, video games, and global positioning system (GPS) capabilities. In some embodiments, an instance of UE 112 performs as a virtual machine or allows third-party apps to run as a container. In some embodiments, an instance of UE 112 is a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In various embodiments, a geographic coverage area 114, also referred to as a cell 114 in some embodiments, is a three-dimensional space having a shape and size based on the configurations of the corresponding base station 108, e.g., a power level, and antenna 110, e.g., a number of sectors. In various embodiments, a geographic coverage area 114 has a substantially spherical, hemispherical, conical, columnar, circular or oval disc, or other shape corresponding to a base station and antenna configuration. In various embodiments, one or both of the shape or size of a geographic coverage area 114 varies over time, e.g., based on a variable base station power level and/or a variable number of activated antenna sectors.

In some embodiments, a size of an instance of geographic coverage area 114 is referred to as a range determined by a maximum distance between two points within the instance of geographic coverage area 114. In some embodiments, an instance of geographic coverage area 114 is referred to as a macro-cell based on a range of 1 kilometer (km) to 30 km, a micro-cell based on a range of 200 meters (m) to 2 km, a pico-cell based on a range of 4 m to 200 m, or a femto-cell based on a range of 1 m to 12 m. In some embodiments, a small cell refers to any of a micro-cell, a pico-cell, or a femto-cell. An instance of geographic coverage area 114 represents the geographic area where an antenna 110 and corresponding UEs 112 are configured to communicate.

In some embodiments, a user of network 104, e.g., a user of one of plurality of devices 102, accesses network 104 through a service provider, a business or organization that sells bandwidth or network access by providing direct internet backbone access to internet service providers and usually access to its network access points (NAPs). Service providers are sometimes referred to as backbone providers or internet providers. Service providers consist of telecommunications companies, data carriers, wireless communications providers, internet service providers, and cable television operators offering high-speed internet access.

Plurality of links 106 include hardware configured to enable electronic communications between plurality of devices 102 and network 104. In various embodiments, one or more of plurality of links 106 is a wired link, e.g., fiber optic, shielded, twisted-pair, or other cabling, or a wireless link type.

In various embodiments, one or more of plurality of links 106 is configured to communicate based on code division multiple access (CDMA), wideband CDMA (WCDMA), time division multiple access (TDMA), frequency division multiple access (FDMA), Orthogonal Frequency Division Multiplexing (OFDM), time division duplexing (TDD), frequency division duplexing (FDD), Bluetooth, Infrared (IR), or the like, or other protocols that may be used in a wired or wireless data communications network. Accordingly, the exemplary illustrations provided herein are not intended to limit the embodiments of the disclosure and are merely to aid in the description of aspects of the embodiments of the disclosure.

In the embodiment depicted in FIG. 1, candidate selector 120 is one or more sets of instructions stored on and executed by device 102A and configured to perform a candidate selection method 300 discussed below with respect to FIG. 3. In some embodiments, candidate selector 120 is stored on and/or executed on one or more devices in addition to or instead of device 102A.

In various embodiments, candidate selector 120 is a standalone program, or a component of or addition to another set of instructions. In some embodiments, candidate selector 120 is included in an orchestrator, i.e., one or more sets of instructions configured to perform automated configuration, coordination, and management of computer systems and software as related to service-oriented architecture, virtualization, provisioning, converged infrastructure, and dynamic datacenter topics, e.g., by aligning business-based requests with applications, data, and infrastructure of the computer systems and software. In the context of cloud computing, the main difference between workflow automation and orchestration is that workflows are processed and completed as processes within a single domain for automation purposes, whereas orchestration includes a workflow and provides a directed action towards larger goals and objectives. In the cloud computing context, an orchestrator is configured to perform cloud management solutions encompassing frameworks for workflow mapping and management with an overall aim of achieving specific goals and objectives, e.g., by meeting application performance goals using minimized cost and maximized application performance within budget constraints. In some embodiments, candidate selector 120 corresponds to a candidate selector 818 discussed below with respect to an orchestrator 816 and FIG. 8.

Candidate storage 130 is one or more files stored on a non-transient, computer-readable storage medium configured to store information corresponding to instances of base stations 108. In some embodiments, candidate storage 130 includes one or more databases. In some embodiments, candidate storage 130 corresponds to a candidate storage 822 stored on a memory 804, discussed below with respect to FIG. 8.

The information in candidate storage 130 corresponding to the instances of base station 108 includes location information. Location information includes latitude and longitude data or other data, e.g., grid or polar coordinate data relative to a reference location such as a city center, whereby a geographic location of a base station or tower is capable of being determined.

In various embodiments, information in candidate storage 130 also includes one or more of tower heights, transceiver types and/or power levels, power configurability, antenna types and/or configurations, antenna configurability, hardware and/or software standards and/or revision levels, user device compatibility and/or capacity specifications, vendor identifiers, vendor rankings, or lease terms such as lengths, costs, availability, restrictions, or other suitable lease criteria.

In various embodiments, tower heights include one or more of an altitude above sea level, a height relative to a local reference point, a height of a building or other structure on which a tower is mounted, or a height of a tower relative to its base.

In the embodiment depicted in FIG. 1, candidate storage 130 is stored on device 102A. In various embodiments, candidate storage 130 is stored on one or more devices in addition to or instead of device 102A, e.g., a server cluster in a data center.

In the embodiment depicted in FIG. 1, candidate selector 120 is communicatively coupled to candidate storage 130 through device 102A, whereby candidate selector 120 is capable of reading from, and writing to, candidate storage 130. In some embodiments, candidate selector 120 is otherwise communicatively coupled to candidate storage 130, e.g., through link 106A, and is thereby capable of reading from, and writing to, candidate storage 130.

Device 102A includes user interface 142 through which one or more users 140 (represented collectively as user 140 in FIG. 1) interact with candidate selector 120. In various embodiments, the interactions include one or more of a user 140 communicating information, uploading files, or submitting instructions to candidate selector 120, or candidate selector 120 providing information to the user 140. In some embodiments, device 102A is configured to operate user interface 142 using a set of instructions such as a user interface 820 discussed below with respect to FIG. 8. In some embodiments, user 140 interacts with candidate selector 120 and user interface 142 through a graphical user interface (GUI), one of non-limiting example GUIs 400-700 discussed below with respect to FIGS. 4-7.

In the embodiment depicted in FIG. 1, user 140 interacts with candidate selector 120 through device 102A and a single instance of user interface 142. In various embodiments, user 140 interacts with candidate selector 120 through one or more of devices 102 instead of or in addition to device 102A, e.g., through multiple instances of user interface 142.

Candidate selector 120 is configured to receive information from user 140 including a nominal location, e.g., a latitude and longitude, of a target geographic coverage area of a telecommunications network, e.g., an instance of geographic coverage area 114. In accordance with method 300 discussed below, candidate selector 120 is configured to select a candidate base station to provide coverage to the target coverage area either as a new coverage area of the telecommunications network or as a replacement for a base station of an existing coverage area of the telecommunications network.

Figure 2:
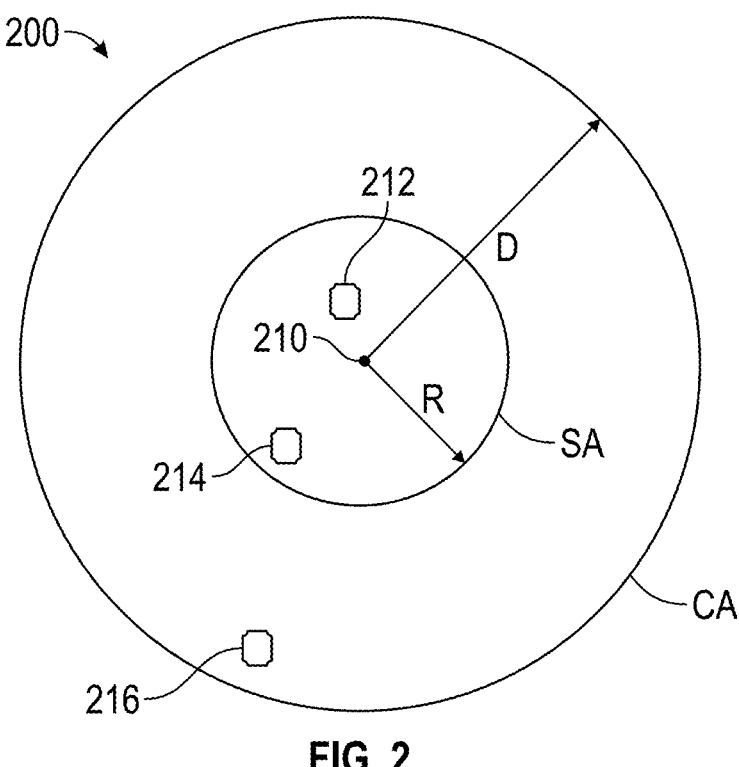
FIG. 2 is a diagram of a communication system, in accordance with some embodiments.

FIG. 2 depicts a non-limiting example of a communication network 200 including a nominal location 210 and a target coverage area CA, in accordance with some embodiments. Communication system 200 is a non-limiting example of a portion of communication system 100.

In the embodiment depicted in FIG. 2, target coverage area CA, corresponding to an instance of geographic area 114, is a two-dimensional circle representing a disc or other three-dimensional volume. The circle is defined by a distance D corresponding to a maximum distance from nominal location 210, distance D thereby corresponding to a radius of the circle. In some embodiments, target coverage area CA is a shape other than a circle, e.g., an ellipse or polygon representing a three-dimensional volume, and distance D otherwise corresponds to a maximum distance from nominal location 210, e.g., a distance away from nominal location 210 in one or more specific directions.

In various embodiments, target coverage area CA corresponds to a macro-cell, a micro-cell, a pico-cell, or a femto-cell.

In some embodiments, target coverage area CA corresponds to some or all of a geographic domain, e.g., a hotel or office building, a building complex, a campus, an industrial park, a city block or blocks, a shopping center, a town center or mall, a neighborhood, town, village, city, county, state, or province, an island or peninsula, a grid portion, e.g., bounded by latitude and longitude criteria, or other geographically-oriented area.

A search area SA is an area within a circle defined by nominal location 210 and a radius R. Base station candidates 212, 214, and 216 correspond to instances of base station 108 that are potentially capable of providing coverage to target coverage area CA.

In the embodiment depicted in FIG. 2, based on the depicted value of radius R, search area SA includes each of base station candidates 212 and 214 and excludes base station candidate 216. In various embodiments, a first sufficiently small value of radius R would cause search area SA to include only base station candidate 212 and exclude each of base station candidates 214 and 216, a second sufficiently small value of radius R would cause search area SA to include zero base station candidates and exclude each of base station candidates 212, 214, and 216, and a sufficiently large value of radius R would cause search area SA to include each of base station candidates 212, 214, and 216.

As further discussed below with respect to method 300 and FIG. 3, candidate selector 120 is configured to receive, from user 140, base station configuration criteria including a nominal location, e.g., nominal location 210, a coverage area, e.g., target coverage area CA, and a search area, e.g., search area SA.

In addition to the nominal location, coverage area, and search radius, candidate selector 120 is configured to receive from user 140 one or more base station configuration parameters. In some embodiments, the one or more base station parameters are included in the base station configuration criteria. In some embodiments, candidate selector 120 is configured to receive the base station configuration criteria and/or the one or more base station configuration parameters by importing a file, e.g., an Excel or other spreadsheet file.

The one or more base station configuration parameters are quantifiable criteria related to base station usage including technical and/or business factors corresponding to data stored in candidate storage 130 as discussed above. Accordingly, technical factors can include but are not limited to tower heights, transceiver types and/or power levels, power configurability, antenna types and/or configurations, antenna configurability, hardware and/or software standards and/or revision levels, user device compatibility and/or capacity specifications, and business factors can include but are not limited to vendor identifiers or rankings, or lease lengths, costs, availability, or restrictions.

In some embodiments, the one or more base station configuration parameters include ideal values, minimum values, maximum values, or ranges of values for one or more factors, e.g., a minimum tower height, revision level, or ranking level, or a maximum cost.

As discussed below with respect to method 300 and FIG. 3, candidate selector 120 is configured to, based on the base station configuration criteria and parameters, identify a set of base station candidates included in the search area, rank the set of base station candidates, output the ranked set of base station candidates to user 140, and receive a base station selection from user 140. In some embodiments, candidate selector 120 is configured to update a communication system using the base station selection, e.g., by providing the base station selection to an orchestrator.

By the configuration discussed above, communication system 100 including system 200 and candidate selector 120 is capable of automatically receiving, from a user interface, base station configuration criteria including a nominal location, a coverage area, and a search area, uploading base station configuration parameters, identifying a set of base station candidates included in the search area, ranking the candidates, outputting the ranked candidates to the user interface, receiving a base station selection from the user interface, and in some embodiments using the base station selection to update a communication system. Compared to other approaches, a communication system is configured more efficiently, and system functions are more fully utilized such that overall operation of communication system 100 is improved.

FIG. 3 is a flowchart of a network configuration method 300, in accordance with some embodiments. Method 300 is operable on a communication system, e.g., communication system 100 including system 200 discussed above with respect to FIGS. 1 and 2.

Additional operations may be performed before, during, between, and/or after the operations of method 300 depicted in FIG. 3, and some other operations may only be briefly described herein. In some embodiments, other orders of operations of method 300 are within the scope of the present disclosure. In some embodiments, one or more operations of method 300 are not performed. In some embodiments, the operations of method 300 are included in another method, e.g., a method of operating an orchestrator.

In some embodiments, some or all of the operations of method 300 discussed below are capable of being performed automatically, e.g., by candidate selector 120 discussed above with respect to FIGS. 1 and 2 and/or by using processing circuitry 802 discussed below with respect to FIG. 8.

At operation 310, base station configuration criteria including a nominal location, a coverage area, and a search area are received from a user interface. Receiving the base station configuration criteria includes candidate selector 120 receiving the base station configuration criteria from user 140 as discussed above.

In some embodiments, receiving the nominal location includes receiving latitude and longitude data. In some embodiments, receiving the nominal location includes receiving nominal location 210 discussed above.

Receiving the coverage area includes receiving data corresponding to a two-dimensional area, e.g., a circle, polygon, or other defined region, referenced to the nominal location. In some embodiments, receiving the coverage area includes receiving a distance from the nominal location, thereby defining a circular coverage area, e.g., receiving distance D from nominal location 210, thereby defining coverage area CA as discussed above.

Receiving the search area includes receiving data corresponding to a two-dimensional area, e.g., a circle, polygon, or other defined region, referenced to the nominal location. In some embodiments, receiving the search area includes receiving a radius from the nominal location, thereby defining a circular search area, e.g., receiving radius R from nominal location 210, thereby defining search area SA as discussed above.

In some embodiments, receiving the search area includes receiving revised data corresponding to the two-dimensional area, e.g., an increased or decreased value of a radius such as radius R discussed above.

In some embodiments, receiving the base station configuration criteria from the user interface includes receiving one or more indicators corresponding to one or more of the nominal location, coverage area, or search area, e.g., a selection of a file or database entry, or a file identifier. In some embodiments, receiving the base station configuration criteria includes importing/uploading one or more files and/or retrieving one or more of the nominal location, coverage area, or search area, e.g., from a database or orchestrator.

In some embodiments, operation 310 is repeated, whereby one or more of the nominal location, coverage area, or search area is modified.

At operation 320, base station configuration parameters are uploaded. Uploading the base station configuration parameters includes candidate selector 120 receiving one or more names or other indicators corresponding to the base station configuration parameters discussed above, e.g., an indicator corresponding to a tower height or vendor ranking.

In some embodiments, uploading the base station configuration parameters includes importing one or more files, e.g., an Excel or other type of spreadsheet, including some or all of the indicators. In some embodiments, uploading the base station configuration parameters includes receiving some or all of the indicators from a database or other storage device and/or through a user interface, e.g., user interface 142 discussed above.

In various embodiments, uploading the base station configuration parameters includes user 140 selecting one or more parameters, based on the parameters being included in or excluded from the imported file or by providing user input separate from an imported file, e.g., by selecting from a list.

In some embodiments, operations 310 and 320 are performed together.

At operation 330, a set of base station candidates included in the search area is identified. Identifying the set of base station candidates includes candidate selector 120 identifying instances of base station 108 included in the search area, e.g., search area SA discussed above, by matching location data corresponding to the instances of base station 108 to the search area.

In some embodiments, identifying the set of base station candidates includes filtering the instances of base station 108 matched to the search area by including only the instances of base station 108 having coverage areas that overlap with the entirety of, or a minimum percentage of, the target coverage area, e.g., coverage area CA of nominal location 210.

In various embodiments, identifying the set of base station candidates includes candidate selector 120 accessing candidate storage 130 discussed above, uploading one or more files including base station candidate data, and/or receiving base station candidate data through a user interface, e.g., user interface 142 discussed above.

In some embodiments, identifying the set of base station candidates includes using the base station configuration parameters to filter the base station candidate data based on one or more minimum values, maximum values, or ranges of values, e.g., by including only candidates corresponding to a minimum tower height, revision level, or ranking level, and/or a maximum cost.

At operation 340, the set of base station candidates is ranked. Ranking the set of base station candidates includes candidate selector 120 applying a ranking algorithm based on values of the base station configuration parameters uploaded in operation 320 to each candidate of the set of base station candidates identified in operation 330, thereby assigning a score to each candidate.

In various embodiments, the ranking algorithm is based on one or more of a tower height, a proximity to the nominal location, a revision level, a vendor ranking level, or other base station configuration parameters discussed above. In some embodiments, the ranking algorithm is based on a difference between an actual value and an ideal value, e.g., a tower height, power level, or cover area percentage.

In various embodiments, the ranking algorithm includes one or a combination of a weighting algorithm or a hierarchical algorithm. In a non-limiting example of a weighting algorithm, the score is based on a sum of a tower height having a 75% weight and a nominal location proximity value having a 25% weight.

In a non-limiting example of a hierarchical algorithm, a first vendor having a higher ranking level than that of a second vendor is assigned a score above that of the second vendor independently of the values of other parameters. In a non-limiting example of a combination algorithm, the weighting algorithm is applied to distinguish between first and second vendors having a same ranking level as determined by the hierarchical algorithm.

At operation 350, the ranked set of base station candidates are output to the user interface. Outputting the ranked set of base station candidates includes candidate selector 120 outputting the ranked set of base station candidates to user interface 142.

In some embodiments, outputting the ranked set of base station candidates includes outputting a list of the ranked set of base station candidates sorted based on the corresponding scores. In some embodiments, outputting the list includes sorting and/or adding a highlight or other indicator to an existing list of candidates. In some embodiments, the list includes one or more candidates in addition to those in the ranked set of base station candidates, e.g., a candidate included in the target coverage area and excluded from the search area as discussed above with respect to FIG. 2.

In some embodiments, outputting the ranked set of base station candidates includes outputting only the base station candidate having the highest score. In some embodiments, no base station candidates are identified in operation 330, and outputting the ranked set of base station candidates includes outputting a corresponding indictor to the user interface.

In some embodiments, some or all of operations 310-350 are repeated based on receiving a series of user inputs and/or uploads from the user interface, the multiple user inputs and/or uploads corresponding to changes in one or more of the nominal location and/or coverage area, the search area, e.g., based on modified radius values, and/or the base station configuration parameters, e.g., modified revision levels.

At operation 360, a base station selection is received from the user interface. Receiving the base station selection includes candidate selector 120 receiving the base station selection from user interface 142.

In some embodiments, receiving the base station selection includes receiving an indication of a base station candidate included in the ranked set of base station candidates. In some embodiments, receiving the base station selection includes receiving an indication of a base station candidate other than those included in the ranked set of base station candidates, also referred to as a manual selection in some embodiments.

In some embodiments, operation 360 is not performed, and candidate selector 120 automatically selects the base station candidate in the ranked set of base station candidates having the highest score.

At operation 370, in some embodiments, a communication system is updated with the base station selection. Updating the communication system includes candidate selector 120 providing the base station selection to a system configuration manager or program, e.g., an orchestrator.

In some embodiments, updating the communication system includes providing the base station selection to a business entity, e.g., as part of entering into or conforming with a lease agreement with the vendor corresponding to the base station selection.

By executing some or all of the operations of method 300, received base station configuration criteria and parameters are ranked and output to a user interface, and a base station selection is received and in some embodiments used to update a communication system, thereby achieving the benefits discussed above with respect to communication system 100 including system 200.

Figure 6:
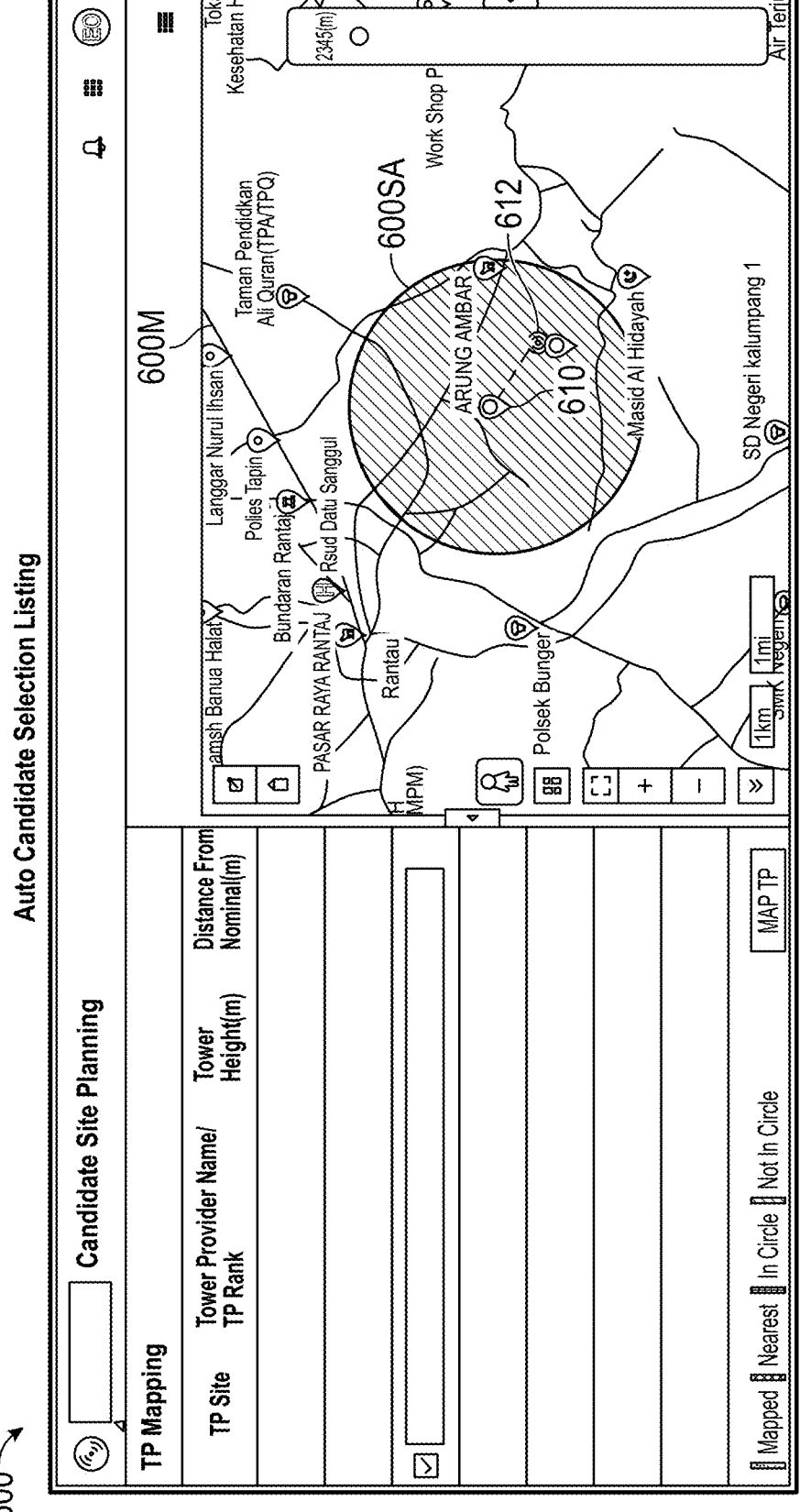
FIG. 6 depicts a non-limiting example of a GUI, in accordance with some embodiments.

Each of FIGS. 4-6 depicts a non-limiting example of a respective GUI 400-600, in accordance with some embodiments. Each of GUIs 400-600 is capable of being implemented on user interface 142 discussed above based on one or more sets of instructions, e.g., user interface 820 discussed below, and is configured to facilitate execution of a corresponding portion of the operations of method 300 discussed above.

GUI 400 depicted in FIG. 4 is configured to display and receive information corresponding to each one of a plurality of nominal sites. A first column lists Nominal Site identifiers, and a second column lists corresponding nominal site location data, e.g., a latitude and longitude of nominal site 210 discussed above.

For each nominal site listed, additional columns identify a number of candidates mapped to a search ring, each of an actual and a planned search ring radius, an ideal tower height, and a candidate availability indictor based on the number of candidates and one or more filter criteria.

Top panel buttons are configured to enable a user to upload files, e.g., an Excel file, including base station configuration data, and to initiate activity, e.g., displaying GUI 500 including task information.

GUI 500 depicted in FIG. 5 is configured to display and receive information corresponding to tasks associated with a given nominal site. The tasks include a candidate planning task 510 for which a drop-down menu enables a user to initiate activity, e.g., displaying GUI 600 including a map based on a nominal site and corresponding candidates.

GUI 600 depicted in FIG. 6 is configured to display and receive information corresponding to candidates associated with a given nominal site. The information for each candidate includes location data TP Site, a candidate identifier Tower Provider Name, a candidate rank TP Rank, a tower height, a distance from the nominal location, and a priority indicator.

The displayed information includes a candidate map 600M including a search area 600SA superimposed on a geographic map background. Search area 600SA is a search ring centered on a nominal location 610 and having a radius based on a user input. A candidate 612 is within search area 600SA based on having a proximity to nominal location 610 less than the search ring radius.

Drop-down menus (not shown) and/or check boxes or the like enable a user to map or un-map the information, e.g., based on a current value of a search ring radius, and/or remove or select a candidate from the set of candidates corresponding to the nominal site.

In some embodiments, a portion of a GUI, e.g., GUI 600, is configured to enable a user to select a candidate outside of a search area to associate with a given nominal site, e.g., from a list or through additional user input such as a file upload.

GUIs 400-600 depicted in FIGS. 4-6 are non-limiting examples provided for the purpose of illustration. Other GUI configurations through which portions of the operations of method 300 are executed are within the scope of the present disclosure.

Figure 7:
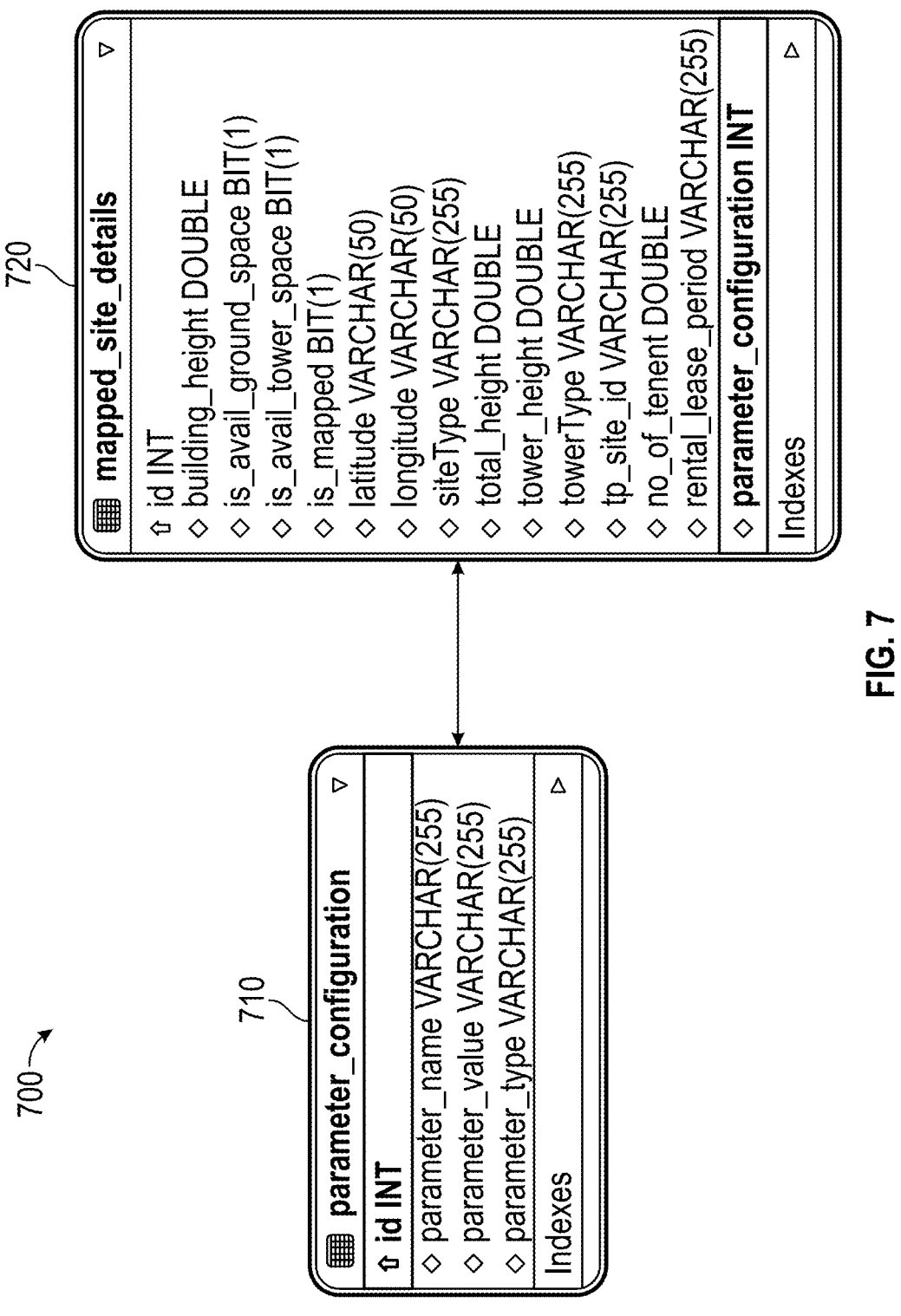
FIG. 7 depicts a non-limiting example of a candidate database configuration, in accordance with some embodiments.

FIG. 7 depicts a non-limiting example of a candidate database configuration 700, in accordance with some embodiments. Candidate database configuration 700 is capable of storing base station configuration data as discussed above.

Candidate database configuration 700 includes a parameter configuration record 710 and a mapped site detail record 720. Parameter configuration record 710 includes a name, value and type, and mapped site detail record 720 includes base station configuration data discussed above, including an identifier parameter-configuration INT corresponding to parameter configuration record 710.

Candidate database configuration 700 depicted in FIG. 7 is a non-limiting example provided for the purpose of illustration. Other candidate storage configurations through which portions of the operations of method 300 are executed are within the scope of the present disclosure.

FIG. 8 is a functional block diagram of a computer or processor-based system 800 upon which or by which an embodiment is implemented.

Processor-based system 800 is programmed to facilitate network application implementation, as described herein, and includes, for example, bus 808, processing circuitry 802, also referred to a processor 802 in some embodiments, and memory 804 components.

In some embodiments, processor-based system 800 includes a communication mechanism such as bus 808 for transferring information and/or instructions among the components of processor-based system 800. Processing circuitry 802 is connected to bus 808 to obtain instructions for execution and process information stored in, for example, memory 804. In some embodiments, processing circuitry 802 is also accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of processing circuitry 802. Similarly, an ASIC is configurable to perform specialized functions not easily performed by a more general-purpose processor. Other specialized components to aid in performing the functions described herein optionally include one or more field programmable gate arrays (FPGA), one or more controllers, or one or more other special-purpose computer chips.

In one or more embodiments, processing circuitry (or multiple processors) 802 performs a set of operations on information as specified by a set of instructions stored in memory 804 related to automated base station selection. The execution of the instructions causes the processor to perform specified functions.

Processing circuitry 802 and accompanying components are connected to memory 804 via bus 808. Memory 804 includes one or more of dynamic memory (e.g., RAM, magnetic disk, writable optical disk, or the like) and static memory (e.g., ROM, CD-ROM, or the like) for storing executable instructions that when executed perform the operations described herein to facilitate automated network configuration. Memory 804 also stores the data associated with or generated by the execution of the operations.

In one or more embodiments, memory 804, such as a random-access memory (RAM) or any other dynamic storage device, stores information including processor instructions for facilitating network application implementation. Dynamic memory allows information stored therein to be changed. RAM allows a unit of information stored at a location called a memory address to be stored and retrieved independently of information at neighboring addresses. Memory 804 is also used by processing circuitry 802 to store temporary values during execution of processor instructions. In various embodiments, memory 804 includes a read only memory (ROM) or any other static storage device coupled to bus 808 for storing static information, including instructions, that is not capable of being changed by processing circuitry 802. Some memory is composed of volatile storage that loses the information stored thereon when power is lost. In some embodiments, memory 804 includes a non-volatile (persistent) storage device, such as a magnetic disk, optical disk, or flash card, for storing information, including instructions, that persists even when system 800 is turned off or otherwise loses power.

The term "computer-readable medium" as used herein refers to any medium that participates in providing information to processing circuitry 802, including instructions 806 for execution. Such a medium takes many forms, including, but not limited to computer-readable storage medium (e.g., non-volatile media, volatile media). Non-volatile media includes, for example, optical or magnetic disks. Volatile media include, for example, dynamic memory. Common forms of computer-readable media include, for example, a floppy disk, a flexible disk, a hard disk, a magnetic tape, another magnetic medium, a CD-ROM, CDRW, DVD, another optical medium, punch cards, paper tape, optical mark sheets, another physical medium with patterns of holes or other optically recognizable indicia, a RAM, a PROM, an EPROM, a FLASH-EPROM, an EEPROM, a flash memory, another memory chip or cartridge, or another medium from which a computer reads. The term computer-readable storage medium is used herein to refer to a computer-readable medium.

Instructions 806 include an orchestrator 816 including a candidate selector 818, which corresponds to candidate selector 120 discussed above with respect to FIGS. 1-7 and is therefore not further discussed. Instructions 806 also include a user interface 820, one or more sets of instructions configured to allow effective operation and control of system 800 by a user. In some embodiments, user interface 820 is configured to operate though one or more layers, including a human-machine interface (HMI) that interfaces machines with physical input hardware such as keyboards, mice, or game pads, and output hardware such as computer monitors, speakers, printers, and other suitable user interfaces, e.g., user interface 142 discussed above with respect to FIGS. 1-7.

In the embodiment depicted in FIG. 8, memory 804 also includes a candidate storage 822 which corresponds to candidate storage 130 discussed above with respect to FIGS. 1-7 and is therefore not further discussed. In some embodiments, memory 804 does not include candidate storage 822.

In some embodiments, a method executed by a processor includes receiving, from a user interface, base station configuration criteria including a nominal location, a coverage area, and a search area, uploading base station configuration parameters, identifying, based on the base station configuration criteria and the base station configuration parameters, a set of base station candidates included in the search area, ranking the set of base station candidates, outputting the ranked set of base station candidates to the user interface, and receiving a base station selection from the user interface. In some embodiments, receiving the base station configuration criteria includes receiving the coverage area including a circle defined by a maximum distance from the nominal location. In some embodiments, receiving the base station configuration criteria includes receiving the search area including a search ring defined by a search radius relative to the nominal location. In some embodiments, the base station includes a base station tower, and the base station configuration parameters include a base station tower height. In some embodiments, ranking the set of base station candidates is based on predetermined priority levels of each base station candidate of the set of base station candidates. In some embodiments, receiving the base station selection from the user interface includes receiving a selection of a base station other than the highest ranked base station candidate of the set of base station candidates. In some embodiments, the method includes updating a communication system with the base station selection including assigning the base station selection to the nominal location.

In some embodiments, a system includes a user interface, a memory having non-transitory instructions stored therein, and a processor coupled to the memory. The processor is configured to execute the instructions, thereby causing the system to receive, from the user interface, base station configuration criteria including a nominal location, a coverage area, and a search area, upload base station configuration parameters, identify, based on the base station configuration criteria and the base station configuration parameters, a set of base station candidates included in the search area, rank the set of base station candidates, display the ranked set of base station candidates on the user interface, and receive a base station selection from the user interface. In some embodiments, the instructions further cause the system to receive the coverage area including a circle defined by a maximum distance from the nominal location. In some embodiments, the instructions further cause the system to receive the search area including a search ring defined by a search radius relative to the nominal location. In some embodiments, the base station includes a base station tower, and the instructions further cause the system to receive the base station configuration parameters including a base station tower height. In some embodiments, the instructions further cause the system to rank the set of base station candidates based on predetermined priority levels of each base station candidate of the set of base station candidates. In some embodiments, the instructions further cause the system to receive a selection of a base station other than the highest ranked base station candidate of the set of base station candidates. In some embodiments, the instructions further cause the system to update a communication system with the base station selection, including assigning the base station selection to the nominal location.

In some embodiments, a computer-readable medium includes instructions executable by processing circuitry of a system to cause the system to perform operations including receiving, from a user interface, base station configuration criteria including a nominal location, a coverage area, and a search area, uploading base station configuration parameters, identifying, based on the base station configuration criteria and the base station configuration parameters, a set of base station candidates included in the search area, ranking the set of base station candidates, outputting the ranked set of base station candidates to the user interface, and receiving a base station selection from the user interface. In some embodiments, the instructions are executable by the processing circuitry of the system to cause the system to receive the base station configuration criteria by receiving the coverage area including a circle defined by a maximum distance from the nominal location. In some embodiments, the instructions are executable by the processing circuitry of the system to cause the system to receive the base station configuration criteria by receiving the search area including a search ring defined by a search radius relative to the nominal location. In some embodiments, the base station includes a base station tower, and the instructions are executable by the processing circuitry of the system to receive the base station configuration parameters including a base station tower height. In some embodiments, the instructions are executable by the processing circuitry of the system to cause the system to rank the set of base station candidates based on predetermined priority levels of each base station candidate of the set of base station candidates. In some embodiments, the instructions are executable by the processing circuitry of the system to cause the system to receive a selection of a base station other than the highest ranked base station candidate of the set of base station candidates.

The foregoing outlines features of several embodiments so that those skilled in the art better understand the aspects of the present disclosure. Those skilled in the art appreciate that they readily use the present disclosure as a basis for designing or modifying other processes and structures for carrying out the same purposes and/or achieving the same advantages of the embodiments introduced herein. Those skilled in the art also realize that such equivalent constructions do not depart from the spirit and scope of the present disclosure, and that they make various changes, substitutions, and alterations herein without departing from the spirit and scope of the present disclosure.

What is claimed is:

1. A method executed by a processor, the method comprising:

receiving, from a user interface, base station configuration criteria comprising a nominal fixed location, a coverage area relative to the nominal fixed location, and a search area relative to the nominal fixed location;

receiving predefined base station configuration parameters comprising a base station tower height relative to a fixed reference point;

identifying, based on the base station configuration criteria and the predefined base station configuration parameters, a set of base station candidates included in the search area;

ranking the set of base station candidates by analyzing each candidate of the set of base station candidates based on the predefined base station configuration parameters including the base station tower height and a proximity of each candidate of the set of base station candidates to the nominal fixed location; and selecting a base station from the ranked set of base station candidates.

2. The method of claim 1, wherein the receiving the base station configuration criteria comprises receiving the coverage area comprising a circle defined by a maximum distance from the nominal location.

3. The method of claim 1, wherein the receiving the base station configuration criteria comprises receiving the search area comprising a search ring defined by a search radius relative to the nominal location.

4. The method of claim 1, wherein the ranking the set of base station candidates is based on predetermined priority levels of each base station candidate of the set of base station candidates.

5. The method of claim 1, wherein the selecting the base station comprises selecting a base station other than the highest ranked base station candidate of the set of base station candidates.

6. The method of claim 1, further comprising:

updating a communication system with the base station selection, wherein the updating the communication system comprises assigning the base station selection to the nominal location.

7. A system, comprising:

a user interface;

a memory having non-transitory instructions stored therein; and a processor coupled to the memory, and being configured to execute the instructions, thereby causing the system to:

receive, from the user interface, base station configuration criteria comprising a nominal fixed location, a coverage area relative to the nominal fixed location, and a search area relative to the nominal fixed location;

receive predefined base station configuration parameters comprising a base station tower height relative to a fixed reference point;

identify, based on the base station configuration criteria and the predefined base station configuration parameters, a set of base station candidates included in the search area;

rank the set of base station candidates by analyzing each candidate of the set of base station candidates based on the predefined base station configuration parameters including the base station tower height and a proximity of each candidate of the set of base station candidates to the nominal fixed location; and select a base station from the ranked set of base station candidates.

8. The system of claim 7, wherein the instructions further cause the system to:

receive the coverage area comprising a circle defined by a maximum distance from the nominal location.

9. The system of claim 7, wherein the instructions further cause the system to:

receive the search area comprising a search ring defined by a search radius relative to the nominal location.

10. The system of claim 7, wherein the instructions further cause the system to:

rank the set of base station candidates based on predetermined priority levels of each base station candidate of the set of base station candidates.

11. The system of claim 7, wherein the instructions further cause the system to:

select a base station other than the highest ranked base station candidate of the set of base station candidates.

12. The system of claim 7, wherein the instructions further cause the system to:

update a communication system with the base station selection, wherein the updating the communication system comprises assigning the base station selection to the nominal location.

13. A non-transitory, computer-readable medium including instructions executable by processing circuitry of a system to cause the system to perform operations comprising:

receiving, from a user interface, base station configuration criteria comprising a nominal fixed location, a coverage area relative to the nominal fixed location, and a search area relative to the nominal fixed location;

receiving predefined base station configuration parameters comprising a base station tower height relative to a fixed reference point;

identifying, based on the base station configuration criteria and the predefined base station configuration parameters, a set of base station candidates included in the search area;

ranking the set of base station candidates by analyzing each candidate of the set of base station candidates based on the predefined base station configuration parameters including the base station tower height and a proximity of each candidate of the set of base station candidates to the nominal fixed location; and selecting a base station from the ranked set of base station candidates.

14. The non-transitory, computer-readable medium of claim 13, wherein the instructions are executable by the processing circuitry of the system to cause the system to receive the base station configuration criteria by receiving the coverage area comprising a circle defined by a maximum distance from the nominal location.

15. The non-transitory, computer-readable medium of claim 13, wherein the instructions are executable by the processing circuitry of the system to cause the system to receive the base station configuration criteria by receiving the search area comprising a search ring defined by a search radius relative to the nominal location.

16. The non-transitory, computer-readable medium of claim 13, wherein the instructions are executable by the processing circuitry of the system to cause the system to rank the set of base station candidates based on predetermined priority levels of each base station candidate of the set of base station candidates.

17. The non-transitory, computer-readable medium of claim 13, wherein the instructions are executable by the processing circuitry of the system to cause the system to select a base station other than the highest ranked base station candidate of the set of base station candidates.

18. The method of claim 1, wherein the analyzing each candidate of the set of base station candidates based on the predefined base station configuration parameters including the base station tower height and the proximity of each candidate of the set of base station candidates to the nominal fixed location comprises applying a first weight to the base station tower height and a second weight to the proximity of each candidate of the set of base station candidates to the nominal fixed location.

19. The system of claim 7, wherein the instructions further cause the system to:

analyze each candidate of the set of base station candidates based on the predefined base station configuration parameters including the base station tower height and the proximity of each candidate of the set of base station candidates to the nominal fixed location by applying a first weight to the base station tower height and a second weight to the proximity of each candidate of the set of base station candidates to the nominal fixed location.

20. The non-transitory, computer-readable medium of claim 13, wherein the instructions are executable by the processing circuitry of the system to cause the system to analyze each candidate of the set of base station candidates based on the predefined base station configuration parameters including the base station tower height and the proximity of each candidate of the set of base station candidates to the nominal fixed location by applying a first weight to the base station tower height and a second weight to the proximity of each candidate of the set of base station candidates to the nominal fixed location.

* * * * *